United States Patent [19]
Story

[11] Patent Number: 5,455,856
[45] Date of Patent: Oct. 3, 1995

[54] METHOD AND SYSTEM FOR PARTIALLY AUTOMATING FEEDER AND DISTRIBUTION CABLE CROSS-CONNECTS

[75] Inventor: Roger E. Story, Bridgewater, N.J.

[73] Assignee: Bell Communications Research, Inc., Livingston, N.J.

[21] Appl. No.: 50,927

[22] Filed: Apr. 21, 1993

[51] Int. Cl.[6] .............................. H04M 3/00; H04M 3/22
[52] U.S. Cl. ......................... 379/327; 379/29; 379/334; 379/335
[58] Field of Search .............................. 379/1, 2, 12, 22, 379/26, 29, 32, 34, 335, 325, 326, 327, 333, 334, 337

[56] References Cited

U.S. PATENT DOCUMENTS 4,661,971  4/1987  Nemchek .................................. 379/29
4,833,708  5/1989  Goodrich ............................ 379/335 X Primary Examiner—Jeffery A. Hofsass
Assistant Examiner—Harry S. Hong
Attorney, Agent, or Firm—Leonard Charles Suchyta; Joseph Giordano

[57] ABSTRACT

A partially automated cross-connect method and system for temporarily provisioning telephone services through the remote activation of a cross-connect between a feeder cable pair and a distribution cable using a bus pair. Permanent cross-connects are deferred until a sufficient number are accumulated that warrant a dispatch to the cross-connect location by a telephone company technician. Where the technician would manually install permanent cross-connects in place of all the previously installed temporary cross-connects. The connections previously made using the bus pair would be deactivated freeing the bus pair for future temporary cross-connects.

5 Claims, 4 Drawing Sheets

5,455,856

METHOD AND SYSTEM FOR PARTIALLY AUTOMATING FEEDER AND DISTRIBUTION CABLE CROSS-CONNECTS

TECHNICAL FIELD OF THE INVENTION

This patent relates to cross-connect arrangements for feeder, distribution, and building cable systems and more particularly to automated cross-connect arrangements.

BACKGROUND OF THE INVENTION

Telephone companies in the provisioning of telephone services must make connections between feeder cable pairs and distribution cable pairs in field locations in the telephone plant. Currently, this is accomplished manually. Whenever a customer orders telephone service and a cross-connect is required, a technician is dispatched to the cross-connect location to accomplish the task. However, manual cross-connects are labor intensive, because they require travel time to the cross-connect location, and are therefore quite expensive. In addition, they have to be completed on a per order basis in order for the telephone companies to provide service in a timely manner. Some have proposed placing a full switching matrix at each of the cross-connect locations to reduce the labor cost associated with provisioning service while increasing the speed at which services are provisioned. With a full switching matrix at the cross-connect location, a technician can accomplish the cross-connect from a remote location by accessing the cross-connect switch matrix and activating the appropriate switch connection. However, a full switching matrix at each of the cross-connect locations is a large capital expense. In addition, once the cross-connects are established they remain in place unchanged for considerable periods of time, therefore a full switching matrix, which is designed to accommodate many repetitive connections, provides a capability far in excess of the true need.

Therefore, it is an object of my invention to automate the cross-connect function without having to provide a full function switching matrix at each cross-connect location in the telephone company's outside plant facilities.

SUMMARY OF THE INVENTION

My invention is a cross-connect method and system for temporarily and remotely activating cross-connects, while deferring the permanent cross-connects until they can be batch processed as a group at the cross-connect location. My invention includes a new automated cross-connect device having a very small number of bus pairs to accomplish the temporary cross-connects and a manual cross-connect area to install the more permanent cross-connects. These bus pairs are configured to be in a switching matrix with each terminated feeder pair and also in a switching matrix with the each terminated distribution pair. The switching elements in each switching matrix are remotely controllable by telephone company technicians so that when a service order is to be provisioned, the technicians can activate a switching element to connect one feeder pair with one end of a bus pair and can activate a second switching element to connect the other end of the bus pair with the distribution pair. When all the bus pairs are active in connections at a cross-connect location, at the receipt of the next service order requiring a cross-connect at that cross-connect location a telephone company technician is dispatched to the location to make all the connections previously cross-connected using bus pairs utilizing the manual cross-connect area. The bus pair connections are deactivated freeing the bus pairs for future temporary connections. The ideal number of bus pairs within each cross-connect device to maximize cost efficiency is two or less.

DETAILED DESCRIPTION

My invention is a partially automated feeder distribution cross-connect system. It provides an automated method to temporarily implement the cross-connects when service is requested while deferring dispatching a technician to the cross-connect location until some minimum number of service orders has accumulated.

Figure 1:
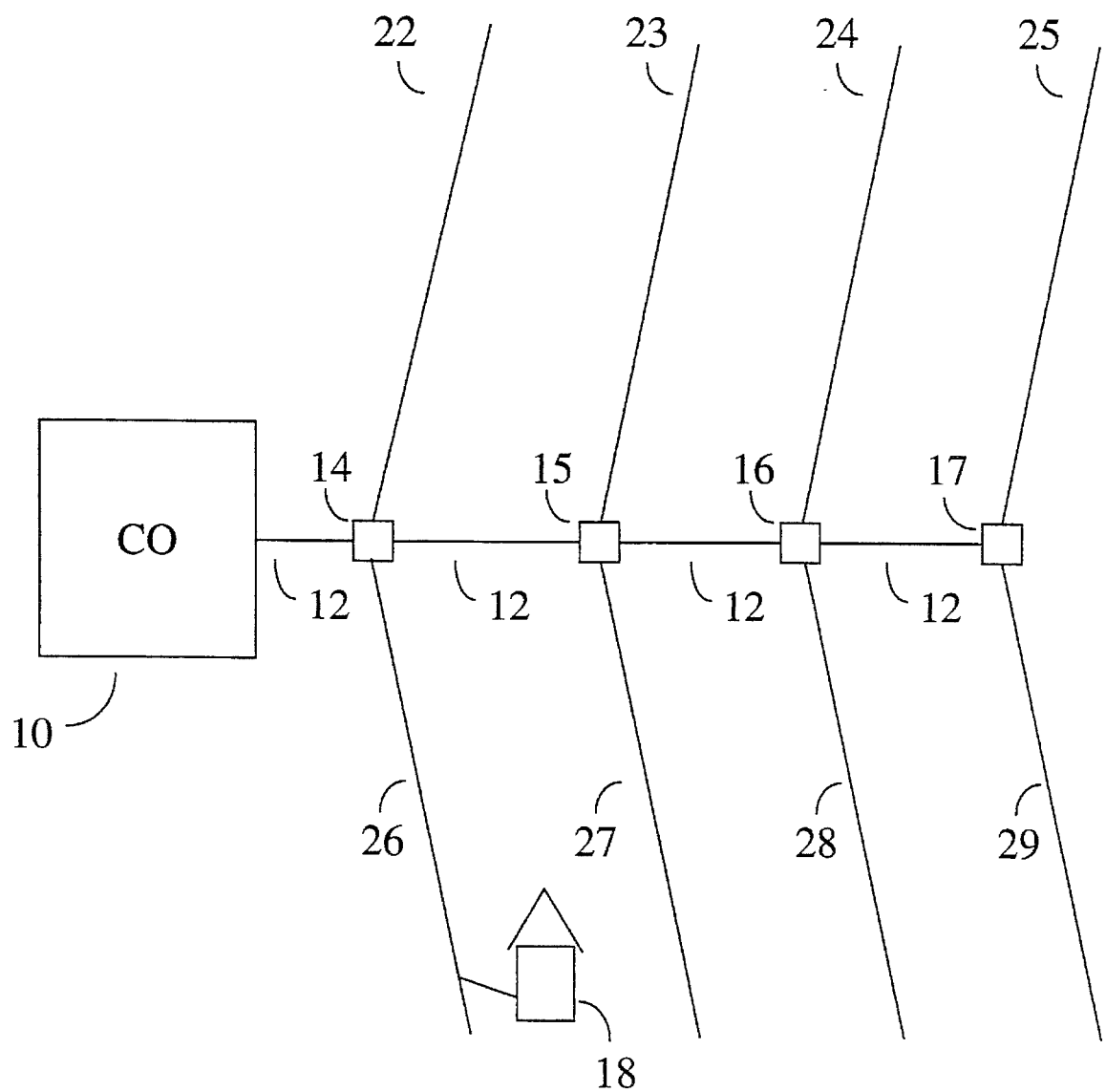
FIG. 1 illustrates the current telephone company outside plant environment for cross-connecting feeder and distribution cable pairs.

FIG. 1 is an illustrative model of the outside plant environment in the telephone industry. From the central office 10 out into the community runs a feeder cable 12. This cable 12 has typically anywhere from 600 to 3600 cable pairs. Groups of these cable pairs are terminated on a plurality of cross-connect boxes, illustratively shown as items 14, 15, 16, and 17. Any cable pair may be terminated at one or more cross-connect boxes. Some of the pairs in the cable may not be terminated and are left idle for future use. From the cross-connect locations, distribution cables, illustratively shown as items 22–29 in FIG. 1, are run into geographic areas to enable the telephone company to provide service to these areas. For example, if a resident of house 18 orders telephone service, the telephone company would assign one cable pair from feeder cable 12 and one cable pair from distribution cable 26 to provide connectivity from the phone company's central office 10 to the customer's house. In the prior art, in order to activate the service a technician would have to be dispatched to cross-connect location 14 to manually connect the assigned cable pair from feeder cable 12 to the assigned cable pair from distribution cable 26. My invention enables the telephone company to quickly and remotely provide service to the customer at house 18 on a temporary basis and then later, when sufficient cross-connects are backlogged, the telephone company can dispatch a technician to the cross-connect box 14 to make all the permanent cross-connects between the officially assigned cable pairs. The batch processing of the cross-connect service orders is more cost-effective to the telephone companies because many fewer dispatches are required.

The biggest cost factor in manually completing cross-connects, as is done in the prior art, is the travel time of the technician to the cross-connect location. For example, if the travel time to cross-connect location equals 1 hour and it takes 10 minutes to complete the cross connect, using the prior art manual system requires 70 minutes in labor time for provisioning service to each customer. If each cross-connect location was equipped with a cross-connect device in accordance with my invention as described below equipped with only one bus pair, the total travel time required for one cross-connect would be reduced to 40 minutes (60 minutes for the dispatch plus 10 minutes each for each cross connect divided by the number of cross-connects). This savings is due to the fact that the technician would only have to be dispatched to the cross-connect location on the receipt of the second service order. If a cross-connect device in accordance with my invention was equipped with two bus pairs, the time associated with each cross-connect, using the figures in the example above, would be reduced to 30 minutes. The time and cost savings of using more than two bus pairs diminishes with each additional bus pair while the cost of the cross-connect device with more than two bus pairs increases.

Figure 2:
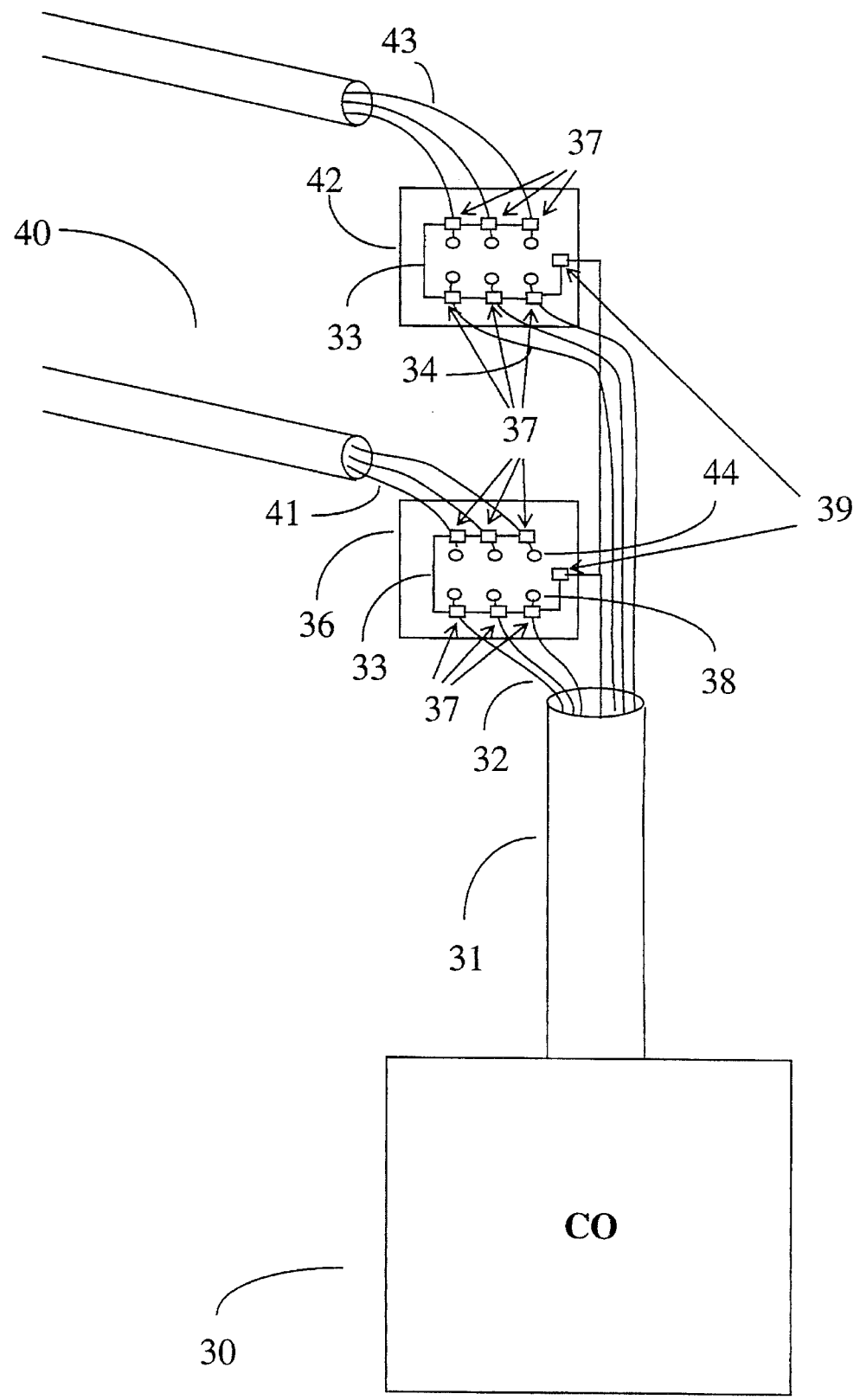
FIG. 2 illustrates my invention for a partially automated cross-connect system.

FIG. 2 depicts an illustrative embodiment of my inventive system. From the telephone company central office 30 to the first cross-connect apparatus 36 is feeder cable 31. At apparatus 36 a subset of the number of feeder pairs 32 from feeder cable 31 are terminated at termination lugs 38 in the cross-connect apparatus 36. Distribution cable pairs 41 from distribution cable 40 are terminated in the cross-connect apparatus 36 at another set of termination lugs 44. A bus pair 33 is connected to switching elements 37 which enable the bus pair to be individually connected to each terminated feeder and each distribution cable pair. The switching elements 37, which advantageously are relays, can be remotely activated by a switching control processor 39 in each cross-connect device 36 and 42. In essence, there is a full matrix switch capability between the bus pair 33, each of the terminated feeder pairs 32, and each of the terminated distribution pairs 41.

The cross-connect apparatus 42 is functionally identical to cross-connect apparatus 36. However, terminated within it are a different subset of feeder cable pairs 34 and distribution pairs 43.

Figure 3:
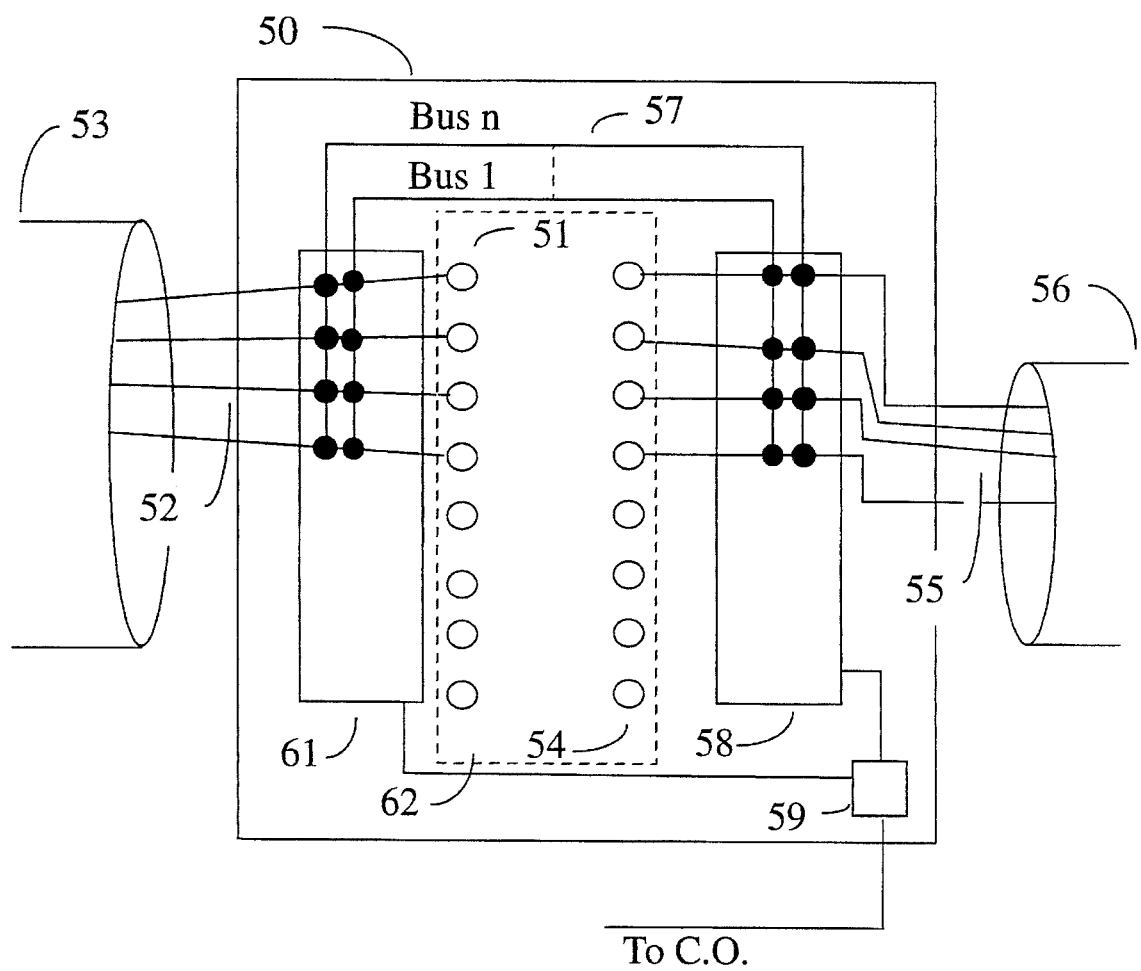
FIG. 3 depicts the functional features of a partially automated cross-connect apparatus.

FIG. 3 depicts in more detail the functional features of the partially automated cross-connect device 50 corresponding to the apparatus 36 and 42 of FIG. 2. The device 50 has termination lugs 51 for terminating a set of individual pairs 52 from the feeder cable 53. It also has termination lugs 54 for the individual pairs 55 of the distribution cable 56. One to n bus pairs 57 are connected in a full access feature switch matrix 61 with all feeder pairs 52 from feeder cable 53, and in a full access switch matrix 58 with all of the distribution pairs 55 from the distribution cable 56 terminated in the device. A control means 59 for providing remote control and access to the switching matrices 58 and 61 is used by telephone company technicians to activate the individual switch elements within each switch matrix 58 and 61. Remotely activated switches are elements that are well known in the art and can be implemented in many ways. One example of the switching technology available in the art is the Mesa Series switching system produced by Cytec Switching Systems Corp. of Penfield, N.Y. Manual cross connect area 62 can be anyone of the known cross-connect devices currently used in the art to make the cross-connects by a technician when the technician is dispatched to the cross-connect location.

The choice of the number of bus pairs to include in my automated cross connect device would depend upon the economics of the situation. There would be a trade-off between the cost of producing a device with additional bus pairs with their additional required switching elements and the cost savings in travel time with each additional bus pair available to temporarily provide service. Each additional bus pair requires switching elements equal to the maximum number of terminated feeder cable pairs and terminated distribution cable pairs. Also, factored into the cost would be the geographic spacing of the cross-connect locations. For example, the greater the travel time to the cross-connect location the larger number of bus pairs active in the devices may prove economical in absolute terms. However, in all instances at least 50% of the travel savings is achieved using cross-connect devices with only two bus pairs.

Figure 4:
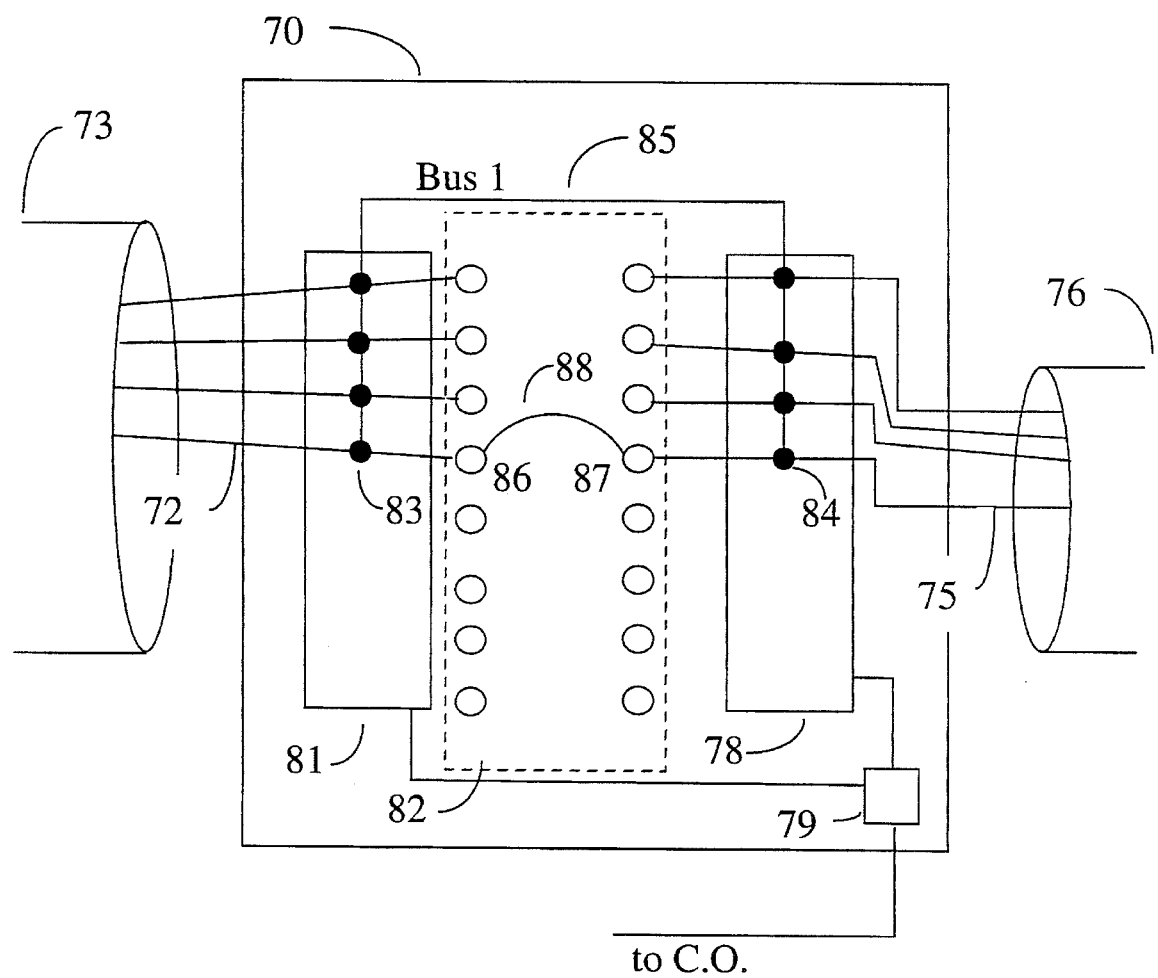
FIG. 4 illustrates a cross connect device in accordance with my invention having only one bus pair.

Using FIG. 4 as a reference, my inventive system works as follows. When the telephone company received an order for service and the provisioning of the service required a cross-connect connect at a cross-connect apparatus location, the telephone company technician would, first, assign an idle feeder pair 72 in feeder cable 73 that feeds that cross-connect location 70, then assign an idle distribution pair 75 in distribution cable 76 which extends to the customer's location, and then activate the switching control means 79 to the two switching elements 81 and 78 to activate the switching points 83 and 84 to make the connection between the assigned feeder pair 72 and the assigned distribution pair 75 using bus pair 85. The use of bus pair 85 to provide service would only be temporary. Upon receipt of a second service order requiring cross-connection at cross-connect location 70, a technician would be dispatched to the cross-connect device location to manually install the cross-connect for the new service order and to manually make the cross-connect for the previously provisioned service order that was temporarily provisioned using the bus pair. Specifically, cable pair 72 and cable pair 75, used in the previous temporary cross-connect, would be manually cross-connected by installing a cross-connect jumper 88 in manual cross-connect area 82 between terminating lugs 86 and 87. The switch control means 79 would be accessed to deactivate switching points 83 and 84 to free up the bus pair for future use.

My system has numerous benefits. The telephone companies would be able to batch process cross-connect work at the cross-connect locations allowing for efficient use of a technician's time and saving considerable travel expenses. Service would be provided more rapidly than current systems and methods. Finally, the capital expense of placing a full feature switch matrix in the outside plant for a fully automated cross-connect capability can be avoided.

Clearly, those skilled in the art recognize that the principles that define our system and method are not limited to the embodiment illustrated herein. Other embodiments may be readily devised by those skilled in the art.

We claim:

1. A method for provisioning telephone cable pair connections from a telephone company central office to a customer location using a partially automated feeder distribution cross-connect device having a plurality of feeder cable pairs terminated on one side of the cross-connect device and a plurality of distribution pairs terminated on another side of said cross-connect device, a manual cross-connect capability, and a switching device for remote access and activation, said method comprising the steps of:

activating the switching device to connect, on a temporary basis, one of said feeder pairs to one of said distribution pairs using a bus pair to rapidly provide service to a customer;

manually cross-connecting, at a later date, using said manual cross-connect capability, said feeder pair to said distribution pair currently connected by said bus pair; and deactivating said switching device to disconnect said bus pair from said feeder pair and distribution pair.

2. The method as recited in claim 1 further including the step of:

waiting to complete the manually cross-connect step until a service order is received that requires a cross-connect at said cross-connect device and said cross-connect device is without any idle bus pairs.

3. A partially automated telephone cable pair cross-connecting device comprising:

a plurality of feeder cable pairs terminated on a first set of connecting lugs;

a plurality of distribution cable pairs terminated on a second set of connecting lugs;

a plurality of bus pairs;

a first plurality of relay switches each interposed between each of said bus pairs and each of said terminated distribution pairs;

a second plurality of relay switches each interposed between each of said bus pairs and each of said terminated feeder pairs;

switching control means for activating remotely one relay switch in each of said first and second plurality of switches necessary to connect one of said terminated feeder pairs to one of said terminated distribution pairs using one of said bus pairs for temporary cross-connection; and a manual cross-connect area for use at a later date by a technician on site to install a more permanent cross-connect.

4. A partially automated telephone cable cross connecting device in accordance with claim 3 wherein the number of said bus pairs is less than 3.

5. A partially automated cross-connect system comprising:

a feeder cable having feeder pairs;

a plurality of distribution cables each having a plurality of distribution cable pairs;

a plurality of cross-connect devices situated along said feeder cable for connecting said feeder cable to each of said distribution cables, each of said cross-connect devices comprising a first set of terminating lugs for terminating cable pairs from said feeder cable, a second set of terminating lugs for terminating distribution pairs from said distribution cable, at least one bus pair, a first switching means for temporarily connecting said first set of terminating lugs to said bus pair, and a second switching means for temporarily connecting said second set of terminating lugs to said bus pair, switching control means for activating said first and second switching means in response to remote control signals, and manual cross-connect means for permanently cross connecting said first and second terminating lugs.

* * * * *